(12) United States Patent
Moellmann et al.

(10) Patent No.: US 9,947,148 B2
(45) Date of Patent: Apr. 17, 2018

(54) METHOD AND SAFETY CONCEPT FOR RECOGNIZING DEFECTS IN A DRIVE SYSTEM OF A MOTOR VEHICLE

(71) Applicant: Bayerische Motoren Werke Aktiengesellschaft, Munich (DE)

(72) Inventors: Joerg Moellmann, Munich (DE); Ralf Cosfeld, Stockdorf (DE); Heiko Stolz, Munich (DE); Florian Oesterreicher, Munich (DE); Christoph John, Garching b. Munich (DE); Karl-Josef Huber, Neufahrn (DE); Hendrikus Smakman, Eichenau (DE); Markus Schneider, Planegg (DE); Heiko Jakob, Shenyang (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 16 days.

(21) Appl. No.: 14/092,388

(22) Filed: Nov. 27, 2013

(65) Prior Publication Data

US 2014/0088817 A1 Mar. 27, 2014

Related U.S. Application Data

(63) Continuation of application No. PCT/EP2012/058465, filed on May 8, 2012.

(30) Foreign Application Priority Data

May 30, 2011 (DE) .................... 10 2011 076 682

(51) Int. Cl.
*G07C 5/08* (2006.01)
*B60T 8/88* (2006.01)
(Continued)

(52) U.S. Cl.
CPC ............ *G07C 5/0808* (2013.01); *B60T 8/885* (2013.01); *B60T 17/22* (2013.01);
(Continued)

(58) Field of Classification Search
CPC .............. G07C 5/0808; B60T 2201/09; B60T 2270/413; B60T 2270/406; B60T 17/22;
(Continued)

(56) References Cited

U.S. PATENT DOCUMENTS 6,407,554 B1 6/2002 Godau et al.
7,211,026 B2 5/2007 Berger et al.
(Continued)

FOREIGN PATENT DOCUMENTS

DE 196 12 857 A1 10/1997
DE 197 31 283 A1 1/1999
(Continued)

OTHER PUBLICATIONS

Rainer et al. (FR2780125 Machine translation into English, provided by Espacenet), Jun. 15, 1999.*
(Continued)

*Primary Examiner* — Mussa A Shaawat
*Assistant Examiner* — Michael V Kerrigan
(74) *Attorney, Agent, or Firm* — Crowell & Moring LLP

(57) ABSTRACT

A method and associated safety system are provided for the recognition of defects in a drive system of a motor vehicle, having an electronically controllable brake control system and having at least one electronically controlled driving engine, an electronically controllable clutch and/or having an electronically controllable transmission. An electronic braking control device is assigned to the brake control system, which braking control device is connected with an independent monitoring module. The independent monitor-
(Continued)

ing module checks for an occurrence of an implausible braking torque, for detecting a defect in the drive system.

17 Claims, 1 Drawing Sheet

(51) Int. Cl.
*B60W 50/02* (2012.01)
*B60W 50/029* (2012.01)
*B60T 17/22* (2006.01)
*B60K 6/48* (2007.10)
*B60W 20/50* (2016.01)

(52) U.S. Cl.
CPC ...... *B60W 50/0205* (2013.01); *B60W 50/029* (2013.01); *B60K 6/48* (2013.01); *B60T 2201/09* (2013.01); *B60T 2270/406* (2013.01); *B60T 2270/413* (2013.01); *B60W 20/50* (2013.01); *B60W 2520/105* (2013.01); *B60W 2520/26* (2013.01); *B60W 2520/28* (2013.01); *Y02T 10/6221* (2013.01)

(58) Field of Classification Search
CPC . B60T 8/885; B60W 50/0205; B60W 50/029; B60W 2520/105; B60W 2520/28; B60W 20/50; B60W 2520/26; B60K 6/48; Y02T 10/6221
See application file for complete search history.

(56) References Cited

U.S. PATENT DOCUMENTS

| | | |
|---|---|---|
| 7,356,401 B2 | 4/2008 | Romer et al. |
| 7,912,610 B2 | 3/2011 | Saito et al. |
| 8,311,715 B2 | 11/2012 | Gierer et al. |
| 8,359,137 B2 | 1/2013 | Feder et al. |
| 2004/0079608 A1* | 4/2004 | Kupper .................. F16D 48/06 192/103 R |
| 2004/0083043 A1 | 4/2004 | Akiyama et al. |
| 2012/0095659 A1* | 4/2012 | Rodrigues et al. ............. 701/69 |

FOREIGN PATENT DOCUMENTS

| | | |
|---|---|---|
| DE | 103 40 529 A1 | 3/2004 |
| DE | 195 23 804 B4 | 4/2006 |
| DE | 10 2005 036 531 A1 | 8/2006 |
| DE | 10 2007 010 894 A1 | 9/2007 |
| DE | 10 2007 001 496 A1 | 7/2008 |
| DE | 10 2007 002 748 A1 | 7/2008 |
| EP | 0 104 539 B1 | 4/1984 |

OTHER PUBLICATIONS

International Search Report with English Translation dated Aug. 2, 2012 (5 pages).

German Search Report with English Translation dated Mar. 21, 2012 (11 pages).

* cited by examiner

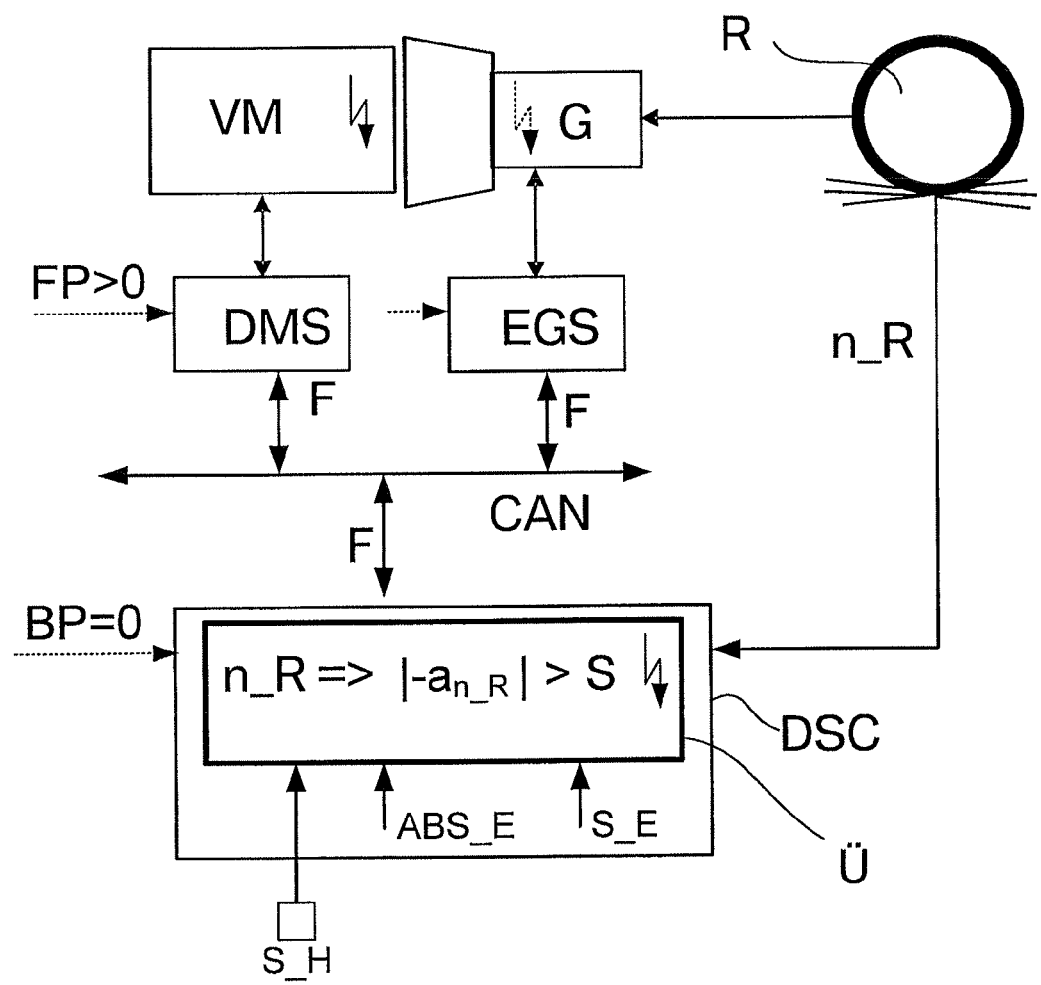

METHOD AND SAFETY CONCEPT FOR RECOGNIZING DEFECTS IN A DRIVE SYSTEM OF A MOTOR VEHICLE

CROSS REFERENCE TO RELATED APPLICATIONS

This application is a continuation of PCT International Application No. PCT/EP2012/058465, filed May 8, 2012, which claims priority under 35 U.S.C. §119 from German Patent Application No. 10 2011 076 682.0, filed May 5, 2011, the entire disclosures of which are herein expressly incorporated by reference.

BACKGROUND AND SUMMARY OF THE INVENTION

The invention relates to a method and a safety concept for the recognition of defects in a drive system of a motor vehicle.

For many years, vehicle manufacturers have had to meet the requirement, on the basis of mandatory standards (such as the ISO or CARB Standard Regulations), that electronic control devices or electronically controlled systems in motor vehicles, as for example, the digital engine control or the adaptive transmission control, have to be able to self-diagnose. This led to the development of, for example, the so-called OBD (Onboard Diagnostic) systems. An example of a further development of an OBD system is described in the applicant's German Patent Document DE 197 31 283 A1.

The motor-vehicle-internal electronic control devices therefore have a large range of software for self-diagnosis. The applicant's German Patent Document DE 196 12 857 A1 describes an example of a control-device-internal self-diagnosis.

The focus of the mandatory self-diagnosis has previously been the inherent safety of each individual control device or each individual electronically controlled vehicle system separately. This results in high application expenditures.

Concerning the further technical background, reference is made to European Patent Document EP 0104539B1 and German Patent Documents DE 10 195 23 804 B4 and DE 10 2007 001 496 A1. Particularly the control of the wheel slip by way of influencing the drive torque or a self-diagnosis of the drive system are known from this prior art.

It is an object of the invention to simplify a recognition of defects in a drive system of a motor vehicle and to increase the safety in the event of a defect.

According to the invention, this task is achieved by providing a method, and associated system, for the recognition of defects in a drive system of a motor vehicle having an electronically controllable brake control system, having at least one electronically controllable driving engine, an electronically controllable clutch, and/or having an electronically controllable transmission. An electronic braking control device is assigned to the brake control system, which electronic braking control device is connected with an independent monitoring module. In this case, the independent monitoring module checks the occurrence of an implausible brake torque for recognizing a defect in the drive system.

The independent monitoring module may, for example, be connected with the braking control device in that it is integrated in the latter as a program module or communicates with the latter—particularly by way of a data bus.

In the case of a corresponding defect recognition, the independent monitoring module preferably outputs a defined defect signal to at least one electronic control device of the drive system, in which case the at least one control device of the drive system will, upon the defined defect signal, interrupt the power connection between the driving engine and the driven wheels or prevent the power transmission of the driving engine.

In addition or as an alternative, the program module for the recognition of a defect in the drive system evaluates particularly the rotational wheel speeds of the driven wheels with a view to a wheel slip recognition. An implausible braking torque is recognized when the wheel slip exceeds a predefined threshold value. The exceeding of a (vehicle) deceleration threshold value or braking torque threshold value derived from the wheel slip threshold value or measured by use of a longitudinal acceleration sensor is equivalent to exceeding a wheel slip threshold value.

Despite the recognition of an implausible braking torque, the recognition of a defect in the drive system can be suppressed when a defined exclusion criterion is present, such as a recognized activated handbrake, a recognized skidding situation, a recognized towing situation or an only brief recognition of an implausible braking torque or a just occurring ABS control.

The invention is based on the following considerations, recognitions and ideas. Certain defects in the case of components of the drive system, for example, of the driving engine or motor (internal-combustion engine and/or electric motor), of the clutch or of the transmission (particularly the automatic transmission) may result in a very high braking torque of the driving wheels. In individual cases, this braking torque may exceed the grip limits of the driving wheels. A safety-relevant driving situation could occur when there is insufficient grip.

According to the invention, an interconnected safety concept is therefore provided, in the case of which, by way of an independent monitoring module, which is connected with the braking control device, a defect recognition program can be implemented. By use of the program a defect of the drive system and not—as customary, of the brake system—is recognized. Thus, a rapid countermeasure becomes possible for establishing a safe condition. In this case, by way of an independent monitoring module, which is connected with the braking control device and may be integrated in the latter, a driving condition is monitored for plausibility. When the braking control device or the monitoring module recognizes particularly a driving condition in which the driving wheels are braked implausibly excessively, it will generate a corresponding defect signal, which is received, for example, by means of the known CAN bus or by way of other communication routes by at least one control device of the drive system (engine/motor control device and/or transmission control device). When the control devices of the drive system receive the corresponding defined defect signal from the monitoring module, the control devices change the components of the drive system into a safe condition in which the braking torque is reduced as fast as possible. This takes place most effectively and most rapidly by interrupting the power connection between the driving engine and the driving wheels or by eliminating any driving torque.

The required measures for interrupting the power connection or power transmission depend on the type of the drive system and of the type of the recognized defect. In this case, the drive system may also consist of more than one driving motor or engine (such as a hybrid drive consisting of an electric motor and an internal-combustion engine). When only an electric motor is present as the driving motor, the latter can be switched into the generator mode for the interruption of the power transmission. When a manual transmission with an electronically controllable clutch is contained in the motor vehicle, the clutch can be opened. When an automated transmission or an automatic transmission is present, corresponding clutches in the transmission can be opened for interrupting the power connection.

As an alternative or in addition, a further aspect of the independent monitoring module and the power connection or power transmission interruption relates to details in the program module for recognizing a defect in the drive system, in the case of which particularly the monitoring of defects in an automatic transmission (lasting transmission defect or sporadic transmission disturbance, in the following only called a transmission defect) may be in the foreground.

In this case, it is recognized, particularly by way of a corresponding evaluation of the rotational wheel speeds of the driven wheels when an implausibly high braking torque (braking interference torque) occurs in the drive train that was (probably) the result of a transmission defect. According to the invention, it is checked in this case whether the driven wheels have a significant coasting slip or are even standing still. It is ensured in the case of this method that the high braking torque as the braking interference torque is caused by the drive train and, for example, not by a situation caused by a pulled handbrake and/or not by a skidding or low-friction value situation because of slippery conditions or because of deep snow or the like.

Because the combination of the lowest gear and a maximal engine coasting torque can also result in high braking decelerations without transmission defects, when monitoring the implausibly high braking torque for the recognition of a transmission defect, a deceleration threshold value for the reliable recognition of a transmission defect would have to be placed close to approximately −4 m/s2. However, this would restrict the functionality to high-friction value situations.

In order to be able to recognize the transmission defect also in low-friction-value situations, the following method is implemented according to the invention.

If a transmission defect were to intensely brake the drive train, because of the resulting high wheel (coasting) slip at the driven wheels, the braking control unit (such as the DSC (Dynamic Stability Control by BMW), because of a slip control intervention implemented anyhow (such as the motor slip intervention (MSR), engine slip control intervention, i.e. an increase of the positive desired engine torque) would demand a maximally possible engine torque. Despite this positive desired engine torque, the driving engine/motor will be unable to stabilize the wheels when a transmission defect is present. The independent monitoring module therefore recognizes the transmission defect by the fact that the driven wheels are in a clear coasting slip (possibly also stationary) and remain so (thus, in the sense of exceeding the predefined wheel slip threshold value for the recognition of a transmission defect), although the driving motor/engine demands a maximal positive desired engine torque.

An advantageous embodiment of the invention consists of the following step. It is assumed that an intact braking control device will demand a strong increasing engine/motor slip intervention (MSR), thus an increase of the positive desired engine torque. As a result, even the prompting of the desired engine torque becomes superfluous. It is sufficient to check whether or not the braking control device is operational. When the MSR function is, for example, not available because of a defective braking control device, the functionality can be limited to a monitoring of decelerations below −4 m/s2 as a fall-back solution (as described above).

For a further protection, it can additionally be checked whether the vehicle deceleration (measured at the longitudinal acceleration sensor that is independent of the brake system) is negative or lower than the vehicle deceleration which could be maximally generated by the brake system (estimation on the basis of the available braking torques).

Summarizing, the independent monitoring module recognizes the transmission defect by the fact that, despite an MSR demand, the driven wheels remain in a significant coasting slip (thus, exceeding of the predefined wheel slip threshold value for the recognition of an implausible braking torque). The recognition of a transmission defect therefore takes place when a defined threshold value characterizing an implausible braking torque is exceeded. Such a threshold value may, for example, be defined as a wheel slip threshold value, as a deceleration threshold value or as a braking torque threshold value.

In an advantageous embodiment of the invention, for example, the following are exclusion criteria for the recognition of a transmission defect, even if an exceeding of the defined threshold value is recognized:

1. Handbrake applied; because also an application of a handbrake could trigger a transmission defect recognition, the monitoring module preferably additionally inputs the handbrake switch whose intact functioning has also been ensured beforehand.

2. Skidding recognition; because significant wheel slip also occurs in skidding situations.

3. An only brief exceeding of the braking torque threshold value; because a braking torque that is implausibly high only for a short time may also occur in the case of backshifting or in the coasting operation with an abrupt transition from a high-friction value situation to a low-friction value situation. A transmission defect is therefore not immediately recognized in the case of an exceeding of a threshold value but only after, in addition, the integral of the rear-axle slip has exceeded a predefined second threshold.

4. A particularly large exceeding of the threshold value in the case of the ABS control; the sensitivity is preferably reduced with respect to the exceeding of a threshold value during an ABS control. For example, the model deceleration is asymmetrically filtered out of the wheel braking pressures. As a result, the monitoring of the exceeding of the threshold according to the invention is neutralized in the case of an ABS control.

5. Towing situation; the monitoring module will be "sharpened" only when the rear wheel speeds have exceeded a minimum value, in order to prevent a defect recognition as a result of a towing operation.

Other objects, advantages and novel features of the present invention will become apparent from the following detailed description of one or more preferred embodiments when considered in conjunction with the accompanying drawings.

BRIEF DESCRIPTION OF THE DRAWING

The drawing FIGURE is a simplified schematic diagram of an embodiment according to the present invention.

DETAILED DESCRIPTION OF THE DRAWING

The drawing illustrates an embodiment of the invention. It is a schematic overview of components of a motor vehicle having a network of electronically controlled systems consisting of an internal-combustion engine VM with an electronic engine/motor control device DMS, an automatic transmission G with an electronic transmission control device EGS and a brake system having an electronic braking control device DSC (Dynamic Stability Control). Furthermore, in a schematic summary having a wheel R, the wheels of the vehicle are illustrated, which have sensors for detecting the rotational wheel speeds n_R. The signals for the acquisition of the rotational wheel speeds n_R are collected and evaluated in the braking control device DSC. An acceleration $-a_{n\_R}$ is computed therefrom, which is determined, for example, from the rotational wheel speeds and, in particular, is negative in this case. The communication of the control devices DMS, EGS and DSC takes place, for example, by way of a digital bus connection, such as CAN. The electronic engine/motor control device DMS receives, for example, also the position of the accelerator pedal FP as a further input signal. The braking control device DSC can also acquire the position of the accelerator pedal FP by way of the CAN and, in addition, receives the position of the brake pedal BP.

For example, by use of the rotational wheel speeds n_R, the position of the accelerator pedal FP and the position of the brake pedal BP, as well as additional data and information present in the DSC braking control device, such as input signals of acceleration sensors, the switching state of the hand brake switch S_H, the skidding recognition S_E, and the ABS control recognition ABS_E, the monitoring module Ü can monitor the driving condition with respect to the rotational wheel speeds n_R with respect to plausibility. The monitoring module Ü according to the invention is in the form of a program module—here, integrated in the braking control device DSC. The monitoring module Ü recognizes a defect in the drive system when, for example, the following implausible driving condition is present: the accelerator pedal is actuated (FP>0), the brake pedal is not actuated (BP=0) and a deceleration amount $|-a_{n\_R}|$ computed by way of the rotational wheel speeds n_R occurs above a defined threshold value S, which permits the conclusion that there is an implausibly high braking torque.

Thus, the electronic braking control device DSC is used in connection with the monitoring module Ü independently of its actual function periphery, for the external diagnosis of the drive system. In the event of a defect recognition, a defined defect signal F is outputted to the CAN. The engine control device DMS and the transmission control device EGS can both receive this defect signal F. For example, in the case of an actual defect of the internal-combustion engine VM, the transmission control device EGS can trigger the transmission G for opening at least one clutch, whereby the power connection between the internal-combustion engine VM and the driving wheels is interrupted. In the case of a recognized transmission defect, a possibly controllable clutch could be opened for interrupting the power connection. In the case of a hybrid vehicle, the power transmission of the electric motor could be switched off when a transmission defect is recognized.

The independent monitoring module Ü is preferably integrated in the braking control device DSC, but may also be integrated in another control device and receive the necessary input signals BP, n_R, etc., for example by way of the data bus CAN, from the braking control device DSC.

By means of this method according to the invention, a simple monitoring system is created which is assigned to the engine/motor control and covers the entire system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for recognizing a defect in a drive system of a motor vehicle equipped with an electronically controllable brake control system, the drive system having an electronically controllable driving engine, an electronically controllable clutch and/or an electronically controllable transmission, wherein the method comprises the acts of:
   assigning an electronic braking control device to the brake control system, the braking control device being connected with an independent monitoring module;
   determining, via the independent monitoring module, an occurrence of an implausible braking torque;
   determining, via the independent monitoring module, that the implausible braking torque was caused by a defect in at least one of the electronically controllable driving engine, the electronically controllable clutch and the electronically controllable transmission, and not by the electronically controllable brake control system;
   upon receiving a defined defect signal from the independent monitoring module, interrupting, via an electronic control device of the drive system, (i) a power connection between the driving engine and driven wheels of the motor vehicle, or (ii) a power transmission of the driving engine.

2. The method according to claim 1, further comprising the act of:
   upon recognizing the defect, outputting, via the independent monitoring module, the defined defect signal to the electronic control device of the drive system.

3. The method according to claim 2, wherein for determining the occurrence of the implausible braking torque, the independent monitoring module evaluated rotational wheel speeds of driven wheels of the motor vehicle for a wheel slip recognition, and determines the occurrence of the implausible braking torque when wheel slip exceeds a predefined threshold value.

4. The method according to claim 2, wherein for determining the occurrence of the implausible braking torque, the independent monitoring module evaluates vehicle deceleration by way of a longitudinal acceleration sensor and/or by way of rotational wheel speeds of driven wheels, the determination of the occurrence of the implausible braking torque being determined when the vehicle deceleration exceeds a predefined threshold value.

5. The method according to claim 1, wherein for determining the occurrence of the implausible braking torque, the independent monitoring module evaluates rotational wheel speeds of driven wheels of the motor vehicle for a wheel slip recognition, and determines the occurrence of the implausible braking torque when wheel slip exceeds a predefined threshold value.

6. The method according to claim 5, further comprising the act of:
   suppressing the recognition of the defect even when the implausible braking torque is determined if a defined exclusion criterion is present.

7. The method according to claim 1, wherein for determining the occurrence of the implausible braking torque, the independent monitoring module evaluates vehicle deceleration by way of a longitudinal acceleration sensor and/or by way of rotational wheel speeds of driven wheels, the determination of the occurrence of the implausible braking torque being determined when the vehicle deceleration exceeds a predefined threshold value.

8. The method according to claim 7, further comprising the act of:
suppressing the recognition of the defect even when the implausible braking torque is determined if a defined exclusion criterion is present.

9. The method according to claim 1, further comprising the act of:
suppressing the recognition of the defect even when the implausible braking torque is determined if a defined exclusion criterion is present.

10. The method according to claim 9, wherein the defined exclusion criterion is one of:
a recognized activated hand brake, a recognized skidding situation, a recognized towing situation, an only brief recognition of the implausible braking torque, or an early ABS control.

11. A safety system for a motor vehicle, comprising:
an electronically controllable brake control system;
one or more of: an electronically controllable driving engine, an electronically controllable clutch, or an electronically controllable transmission;
an electronically controllable braking control device assigned to the brake control system;
an independent monitoring module connected with the braking control device, wherein the independent monitoring module comprises a microprocessor and a computer readable medium having stored thereon program code segments that:
assign an electronic braking control device to the brake control system, the braking control device being connected with an independent monitoring module; and
determine, via the independent monitoring module, an occurrence of an implausible braking torque; and
determine, via the independent monitoring module, that the implausible braking torque was caused by a defect in at least one of the electronically controllable driving engine, the electronically controllable clutch and the electronically controllable transmission, and not by the electronically controllable brake control system; and
at least one controlling device configured to control the drive system and being configured to interrupt a power connection or a power transmission between the driving engine and driven wheels of the motor vehicle on receiving a defined defect signal from the independent monitoring module.

12. The safety system according to claim 11, wherein
the independent monitoring module is connected with the controlling device to output the defined defect signal upon the occurrence of the implausible braking torque, in which event the controlling device interrupts the power connection or the power transmission.

13. The safety system according to claim 12, wherein the microprocessor and computer readable medium having stored thereon program code segments are further configured to suppress the recognition of the defect, even when the implausible braking torque is determined, in response to a recognized skidding situation.

14. The safety system according to claim 12, wherein the microprocessor and computer readable medium having stored thereon program code segments are further configured to suppress the recognition of the defect, even when the implausible braking torque is determined, if a defined exclusion criterion is present.

15. The safety system according to claim 14, wherein the defined exclusion criterion is one of: a recognized activated hand brake, a recognized skidding situation, a recognized towing situation, an only brief recognition of the implausible braking torque, or an early ABS control.

16. The method according to claim 1, further comprising the act of:
suppressing the recognition of the defect, even when the implausible braking torque is determined, in response to a recognized skidding situation.

17. The method according to claim 1, wherein determining that the implausible breaking torque was caused by the defect includes determining whether a wheel slip exceeds a predefined threshold despite a demand for engine torque meeting a predefined threshold.

* * * * *